(12) United States Patent
Wyett et al.

(10) Patent No.: US 7,890,473 B1
(45) Date of Patent: Feb. 15, 2011

(54) METHOD AND SYSTEM FOR EVALUATING PERFORMANCE OF A COMPUTER SYSTEM

(75) Inventors: Richard Michael Wyett, Spring Hill, KS (US); Jianzhou Chen, Olathe, KS (US); Dean Lee Saghier, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 780 days.

(21) Appl. No.: 10/973,500

(22) Filed: Oct. 26, 2004

(51) Int. Cl.
G06F 7/00 (2006.01)
G06F 17/00 (2006.01)
G06F 15/173 (2006.01)
G06F 11/00 (2006.01)

(52) U.S. Cl. .................. 707/688; 707/687; 709/224; 714/47

(58) Field of Classification Search .................. 707/102
See application file for complete search history.

(56) References Cited

U.S. PATENT DOCUMENTS

| | | | | |
|---|---|---|---|---|
| 5,379,406 A * | 1/1995 | Wade | ............................ | 703/21 |
| 5,506,955 A * | 4/1996 | Chen et al. | ..................... | 714/26 |
| 5,572,672 A * | 11/1996 | Dewitt et al. | ................... | 714/47 |
| 5,668,944 A * | 9/1997 | Berry | ........................... | 714/47 |
| 5,701,471 A * | 12/1997 | Subramanyam | ............. | 707/688 |
| 5,949,976 A * | 9/1999 | Chappelle | .................... | 709/224 |
| 6,148,335 A * | 11/2000 | Haggard et al. | ............. | 709/224 |
| 6,367,037 B1 * | 4/2002 | Remer et al. | ................... | 714/47 |
| 6,381,635 B1 * | 4/2002 | Hoyer et al. | .................. | 707/10 |
| 6,405,327 B1 * | 6/2002 | Sipple et al. | ................... | 714/39 |
| 6,467,052 B1 * | 10/2002 | Kaler et al. | .................... | 714/39 |
| 6,505,249 B1 * | 1/2003 | Rehkopf | ....................... | 709/224 |
| 6,691,067 B1 * | 2/2004 | Ding et al. | .................... | 702/186 |
| 6,804,627 B1 * | 10/2004 | Marokhovsky et al. | ....... | 702/182 |
| 6,826,575 B1 * | 11/2004 | Waclawski | ................... | 707/102 |
| 6,885,641 B1 * | 4/2005 | Chan et al. | ................... | 370/252 |
| 7,162,390 B2 * | 1/2007 | Jowett et al. | ................ | 702/182 |
| 2002/0183972 A1 * | 12/2002 | Enck et al. | ................... | 702/186 |

OTHER PUBLICATIONS

Weisstein, Eric W. "Least Squares Fitting." From MathWorld—A Wolfram Web Resource. http://mathworld.wolfram.com/LeastSquaresFitting.html, dated Sep. 29, 2000 by Internet Archive.*

* cited by examiner

*Primary Examiner*—Tim T. Vo
*Assistant Examiner*—Garrett Smith

(57) ABSTRACT

The present invention provides methods and systems for evaluating the performance of a computer system to enable capacity planning. With respect to the present invention, performance data (metrics) collected from computing devices are used to generate performance results. A set of utilization factors are calculated to forecast computing needs without a long manual analysis of large volumes of data. A user has access to a graphical representation of the utilization factors to determine a forecast of capacity needs based on the information calculated.

18 Claims, 5 Drawing Sheets

METHOD AND SYSTEM FOR EVALUATING PERFORMANCE OF A COMPUTER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of computer capacity planning and system utilization.

BACKGROUND OF THE INVENTION

As the population becomes increasingly dependent on computing resources, the need for more computers and access to them becomes larger and more important. Today, millions of people use computing devices with an ever increasing need to have access to them. As a consequence, computing administrators need to be able to accommodate this need and be able to adapt to the volume of software instructions given to computing devices by the many users as well as the numerous applications that run on them. However, a problem remains as to how to adequately forecast computing resources in a dynamic environment. For example, a typical computer may need to handle millions of instructions from a few applications but also may need to handle a group of new users. A challenge is to be able to forecast when a computer or set of computers has reached its capacity in executing both instruction sets from the various applications running on it as well as its ability to handle an increasing number of users wanting access to computing resources. The performance of an entire network can progressively degrade as one or more computers approach their capacity. There is a pervasive need to control the number of computers operating in a network, operating as servers, or operating as other computing devices, and to be able to forecast when such computers need their resources increased or augmented.

Users and application executions are increasing at an alarming rate placing enormous burdens on system resources. A challenge has become a battle to keep pace with these demands by checking and maintaining computers very often to ensure that they can handle the capacity needs placed upon them by the ever increasing number of users and demand for executing more applications.

SUMMARY OF THE INVENTION

The present invention addresses several aspects of maintaining performance of a computing system, including the need to monitor computing resources in a dynamically changing environment and the ability to forecast appropriate changes to keep computing devices and networks operating smoothly. The present invention has several practical applications in the technical arts, not limited to enabling a user to forecast computing resources, computing demands, capacity needs, and the like; determining capacity needs of large volumes of data with little or no manual intervention; and reducing delays between the processing of information and conveying of results.

In a first aspect, a method for evaluating the performance of a computer system is provided. The method includes periodically gathering performance data respectively related to computers; communicating performance data to a data structure; providing a subset of the performance data by sampling the performance data according to a threshold; determining from the subset, a utilization factor associated with each of the computers; and without user interaction, automatically repeating steps to graphically represent the determined utilization factor to evaluate performance.

In a second aspect, a computer-implemented method for evaluating processing capacity is provided. The method includes measuring samples of performance of applications in computers; collecting samples in the computers on a periodic basis; communicating the samples to a computing device over a communication channel with the samples being stored in a data structure; determining a total number of samples in the computing device that were collected on the periodic basis for a pre-determined time interval; identifying a subset of the samples by extracting the subset according to a threshold; calculating a utilization factor from the subset and the samples; plotting the utilization factor; and without user interaction, automatically repeating steps to create a graphical representation from each utilization factor to evaluate processing capacity.

In a third aspect, a system for capacity planning is provided. The system includes at least one computer operable to provide metrics on applications and computing hardware; at least one data structure operable to collect and store metrics related to the at least one computer; at least one computing device operable to manipulate the metrics in the at least one data structure to extract a subset of metrics, to calculate a utilization factor from the subset and the metrics, and to graphically represent the utilization factor; and links operable to interconnect the at least one computer, the at least one data structure, and the at least one computing device to facilitate the transfer of data back and forth.

In a final illustrative aspect, media having compute-useable instructions embodied thereon for causing a computer to perform a method for evaluating the performance of a computer system are provided. The method includes executing software to measure samples of performance of one or more applications in one or more computers; determining from the samples a total count over a pre-determined time interval; extracting from the samples a subset according to a threshold; calculating a utilization factor from the subset and the samples; and graphically representing the utilization factor to evaluate performance.

BRIEF DESCRIPTION OF THE SEVERAL VIEWS OF THE DRAWINGS

The present invention is described in detail below with reference to the attached drawing figures incorporated herein by reference, and wherein.

DETAILED DESCRIPTION OF THE INVENTION

Figure 1:
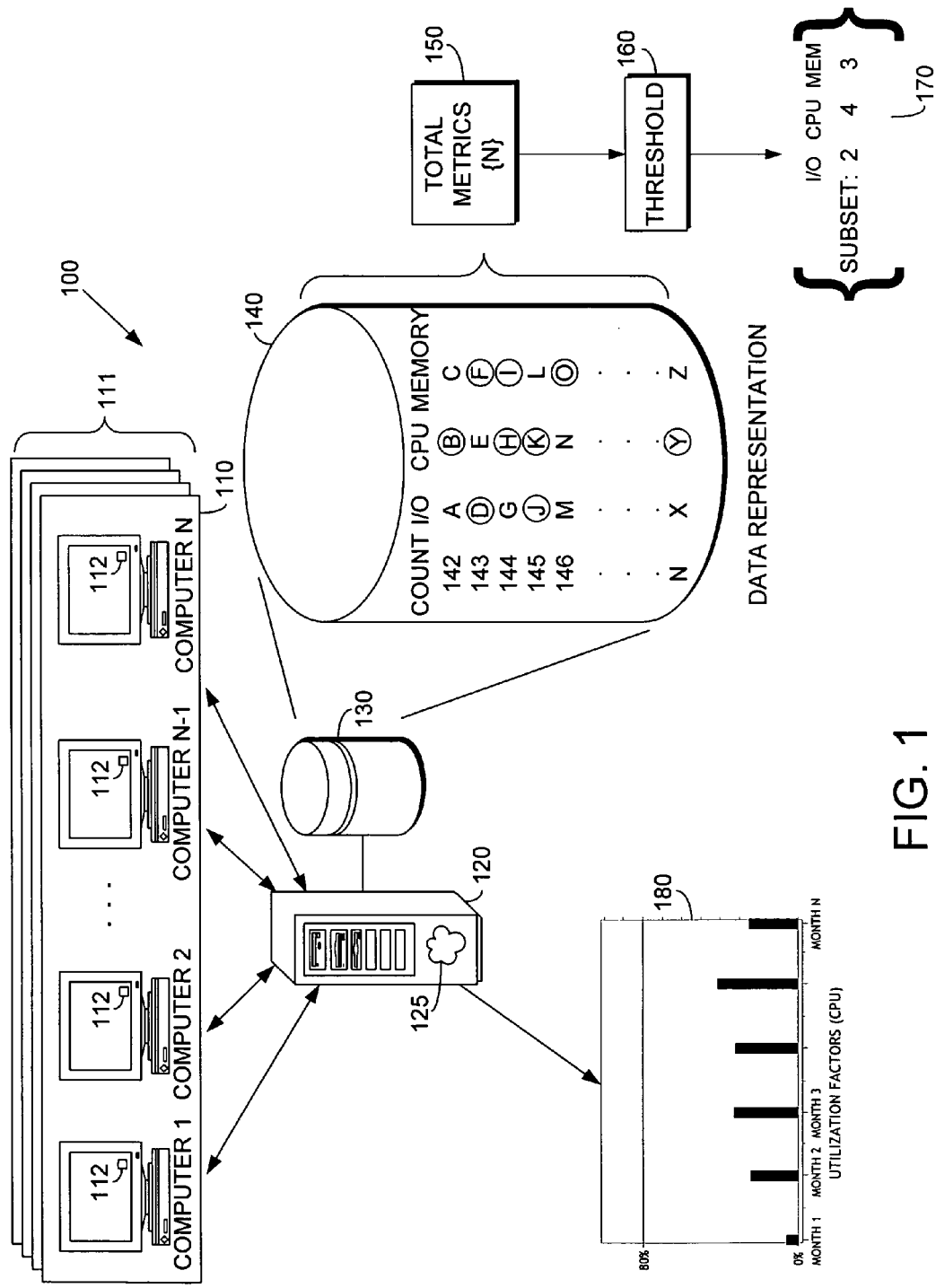
FIG. 1 is a block diagram of an exemplary operating environment suitable for practicing an embodiment of the present invention.

The present invention will be better understood from the detailed description provided below and from the accompanying drawings of various embodiments of the invention, which describe, for example, methods and systems to monitor a plurality of computers, extract relevant data, and implement a methodology to improve system capacity. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and non-removable media, and contemplate media readable by a machine, database, or various other network devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To help explain the invention without obscuring its functionality, a preferred embodiment will now be referenced in connection with a computing network. Although the present invention can be employed in connection with a computing-network environment, it should not be construed as limited to the exemplary applications provided here for illustrative purposes.

FIG. 1 illustrates an exemplary embodiment of the invention and is referenced generally by the numeral 100. Operating environment 100 includes a set of computers 110 that operate in one more networks 111, one or more servers 120 coupled to database 130, a data representation 140, total metrics 150, a threshold 160, a subset 170, and a diagrammatic representation 180 of utilization.

Computers 110 operate in one or more networks 111 and may be dispersed over a large geographical area. The diagram represents computers 110, which may comprise a few computers in one network or several thousand computers in one or more networks 111. Computers 110 exist in various sizes and configurations and can be procured from any number of computer manufacturers to be installed in a network. Computers 110 perform various functions and may or may not perform similar functions or execute similar applications. Each of the computers 110 may be able to handle thousands of requests from various users. For example, many of the computers 110 may operate to handle customer service requests that facilitate commerce. Some of the computers 110 may provide customers with account information and billing data. Some of the computers 110 may provide applications to allow users to access certain computing data. Such access may be made in a variety of ways, such as from a computer terminal or from a telephone residing in a user's home. Those skilled in the art will appreciate that computers 110 may provide a variety of functions and applications for the benefit of many users with varying needs.

Performance data related to computers 110 can be provided in a variety of ways. For example, computers 110 may generate performance data pertaining to central processing unit (CPU) usage, Input/Output (I/O) access, memory usage, disk access usage, or any other type of performance characteristics. The performance data is collected on each of the computers 110 and may respectively be stored temporarily or permanently. An exemplary method of collecting performance data is accomplished using a client-side software 112. An exemplary client-side software 112 is Hewlett Packard's MEASUREWARE software program. The method of collecting performance data is not limited to a particular software program; any number of software programs may be used to accomplish the same task. In one embodiment, performance data is transferred to server 120 and stored in database 130. Performance data may be transferred to server 120 using a variety of software transfer protocols, including file transfer protocol (FTP).

Performance data from across many networks may be collected and transferred to server 120 over any choice of communication channels. One embodiment of collecting performance data at server 120 from computers 110 uses management software 125. An exemplary management software 125 is Hewlett Packard's SERVICE REPORTER software. Management software 125 interacts with client-side software 112 resident on computers 110 to facilitate the transfer of performance data to server 120. Although this embodiment uses this particular commercial software, other software can be used to accomplish the same task.

Server 120 can be a computer that performs special functions on a general purpose machine. Server 120 is coupled to a data structure such as database 130, providing an exemplary component for storing of data. Database 130 can house large numbers of performance data coming to it. Since computers 110 give rise to thousands and perhaps millions of data, a large database 130 is needed to accommodate the collection of those performance data. Database 130 need not be vendor-specific and may be procured and configured according to the preferences of the user. Database 130 may reside in or be substituted for an internal storage device inside of server 120. That embodiment could include the storage of performance data in a data structure located within server 120. The data structure is not confined to the representation shown but may also include random access memory, a spreadsheet, and an array.

Data representation 140 of database 130 illustratively depicts an embodiment of how data can be stored. Data representation 140 is illustrative in nature and abstractly shows performance data collected from computers 110 stored in a single place to facilitate access and processing. For example, data representation 140 may capture many types of performance data respectively related to computers 110 and store them concurrently in database 130. In this case, first row 142 represents a first computing device and its corresponding performance data for I/O, CPU, and memory. Second row 143 represents a second computing device and its corresponding metrics for I/O, CPU, and memory. Alternatively, data representation 140 could capture the data from only one computing device within the network of computers 110. The symbol "N" within data representation 140 indicates the total rows of performance data identified by total metrics 150 for performance data pertaining to I/O, CPU, memory or any other type of performance characteristic.

In FIG. 1, a count of the total metrics 150 is determined. Total metrics 150 provide a denominator to serve as the representation for all performance data collected. According to this embodiment, all calculations depend on an accurate count of total metrics 150. Total metrics 150 can be determined when the last performance data is collected for the computing device. The value of total metrics 150 is a function of how often performance data is collected. For example, if performance data is collected on an hourly interval over a 30-day period, total metrics 150 will equal 720 corresponding to 30 days multiplied by 24 hours. If performance data is collected on a five-minute interval over a 30-day period, total metrics 150 will equal 8,640 corresponding to 30 days multiplied by 24 hours multiplied by 12 (number of 5-minute intervals in an hour). In order to have useful data in determining capacity needs, performance data can be collected as often as possible to provide an accurate representation of the performance of the computing system. In another example, if there are 1,000 computing devices and a desire to capture the I/O, CPU, and memory performance data on a five-minute interval over a 30-day period, database 130 could hold 25,920,000 instances of information. As a result, the present invention reduces the time for such manual processing of large instances of information allowing for a faster turn-around in determining capacity needs for each computing device.

Threshold 160 provides the basis for extracting performance data according to a pre-determined criteria into subset 170. Threshold 160 is pre-defined by the user and may be flexibly changed depending on the performance criteria that is to be targeted. The value for threshold 160 may change depending on the performance data that is being evaluated. For example, there may be a desire that no CPU should attain higher than 80% occupancy on a sustained basis. Therefore, threshold 160 could be set to 80% to extract those performance data that meet the criteria. Alternatively, there may be a desire that disk access should be no higher than 50%. When evaluating this performance data, threshold 160 could be set accordingly to extract the appropriate performance data meeting the criteria. Given by the examples above, threshold 160 forms a key component to the invention in enabling the user to extract the appropriate performance data to evaluate the performance of any number of computing devices in computers 110.

Once threshold 160 has been determined and the appropriate performance data is extracted, subset 170 is determined from the count of metrics that meet the criteria according to threshold 160. The diagram in FIG. 1 illustrates an example of the counts for I/O, CPU, and memory. The performance data in data representation 140 is evaluated in threshold 160 to give rise to the following: two metrics met the criteria for I/O; four metrics met the criteria for CPU, and 3 metrics met the criteria for memory.

With subset 170 and total metrics 150, further calculations can be made within server 120 or in computers 110 to provide utilization factors for performance characteristics. The utilization factors are graphed over periodic intervals to show performance characteristics relative to the collection interval of metrics. Graph 180 provides an illustration of the output of the utilization factors on a monthly basis whereby threshold 160 is set to 80%. The utilization factors show the percentage of times the CPU usage operated over 80%. This information provides the user with a trend analysis to allow forecasting of resources. With the current graph and perhaps subsequent data, a forecast could be determined to indicate when the CPU might consistently operate at or beyond 80% capacity over a sustained time period. With such information, provisions could immediately be made to either enlarge the CPU, provision a second CPU, or procure a second computing device to handle the increase workload.

Figure 2:
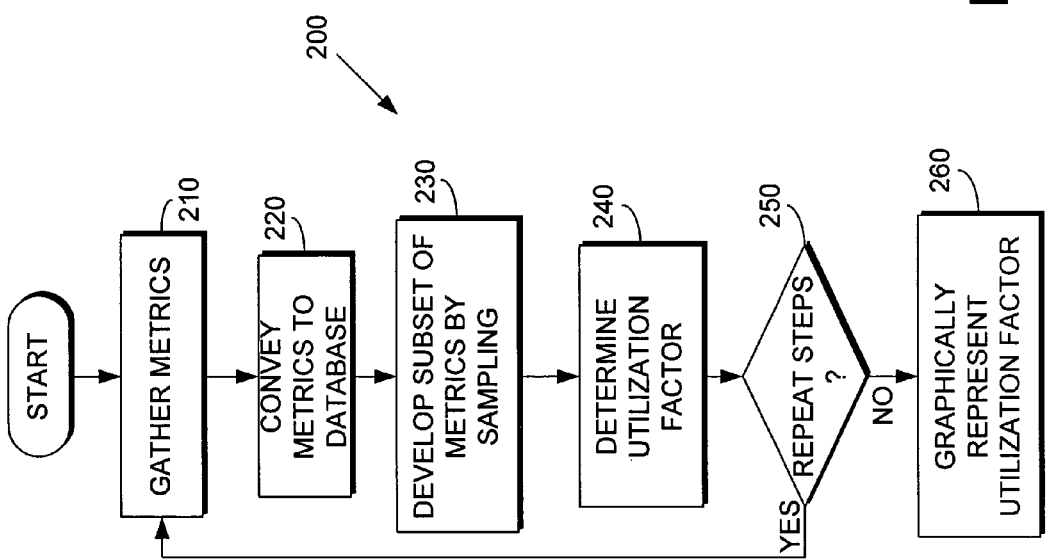
FIG. 2 is a flowchart illustrating an exemplary process for evaluating the performance of a computer system in accordance with an embodiment of the present invention.

Referring now to FIG. 2, a process for evaluating the performance of a computer system is disclosed. The process begins with a step 210, the gathering of metrics. The metrics reside on computers 110 and may be polled by another computer or pushed by computers 110 to a database 130. In a step 220, the metrics are conveyed to database 130. This step occurs in a network environment with perhaps hundreds or thousands of computers operating within the network. In one embodiment, database 130 stores the metrics to accomplish step 220.

The metrics are gathered on a periodic basis. This means that any computing program can be devised to enable the metrics to be collected over intervals as short as seconds or as long as days. The more metrics are collected over smaller intervals, the more accurate the calculations to determine performance needs will be.

A step 230 illustrates the metrics to be sampled to determine a subset. The sampling occurs by using a pre-defined threshold established by the user. The threshold can be any performance criteria but more importantly it usually indicates a critical point in the performance of computing devices where the evaluation for more resources need to be determined. For example, the CPU running at an occupancy of 80% or above may indicate the need for a larger CPU or an additional CPU before the computing device reaches its computing power limit. Step 230 enables the user to set the threshold based on a pre-determined performance criteria. All metrics showing a CPU occupancy at 80% or above would be considered part of the subset. Another example could involve memory whereby the threshold may be set at 50%. Memory usage would be targeted not to exceed 50% over an extended period time in order to provide sufficient capacity for peak usages. Therefore, the threshold could be set for memory at 50% and all metrics achieving or exceeding this threshold could be made part of the subset as indicated by step 230.

A step 240 illustrates the process for determining a utilization factor. The utilization factor is a ratio of the subset created in step 230 divided by the total number of metrics conveyed to the database in step 220. The utilization factor gives rise to percentages to show performance criteria over an extended period. For example, using the values obtained for the CPU, the utilization factor of 30% taken from metrics gathered over a 30-day period at 5-minute intervals would indicate that the CPU occupancy operated at 80% or above for 30% of the time over a 30-day period. The 30-day period would be indicative of a one-month period. Utilization factors could be created for several months of data. This is established by a step 250 which shows that an iterative process occurs to execute again the previously discussed steps in FIG. 2.

A step 260 creates a graphical representation of the utilization factor. As mentioned in the paragraph above, the utilization factor can be established on a monthly interval or any other interval established by the user. The user can have a graphical representation created of all utilization factors to show performance results.

Figure 3:
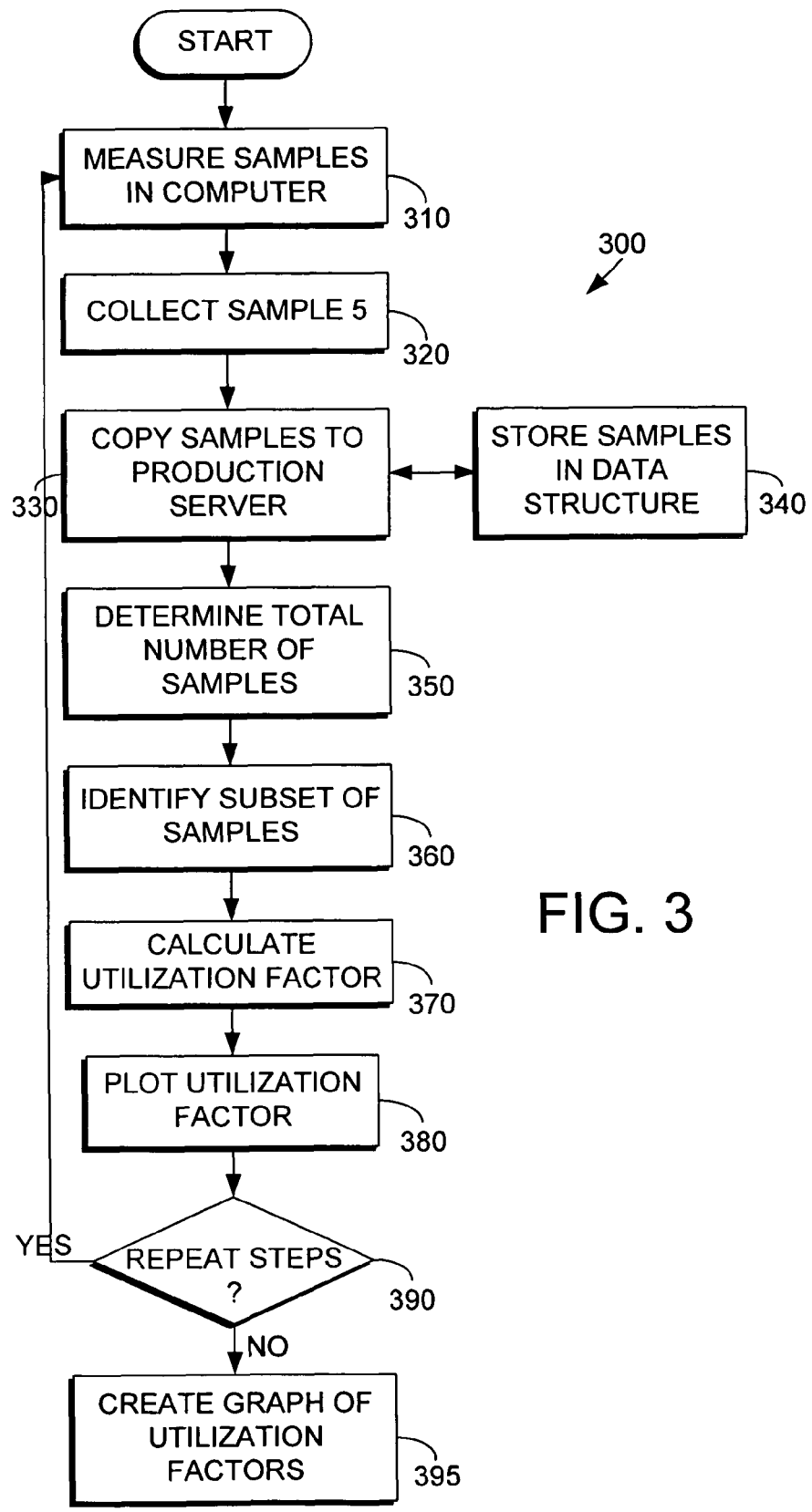
FIG. 3 is a flowchart illustrating an exemplary process for evaluating processing capacity in accordance with an embodiment of the present invention.

Turning now to FIG. 3, an alternate embodiment of the process for evaluating the performance of a computer system is disclosed. Unlike the terminology used in FIG. 2 for metrics, in FIG. 3 samples are measured in a step 310 and collected in a step 320. The same process is essentially disclosed in FIG. 3 as is disclosed in FIG. 2.

In FIG. 3, samples are stored in a data structure in a step 340. The data structure may include a variety of devices including but not limited to a database, a spreadsheet, and an array. According to this embodiment, the user is free to determine the manner in which samples will be stored and managed. The remaining process in FIG. 3 is similar to FIG. 2 with the exception that each utilization is plotted in a step 380 before recursively continuing in the process to find the next utilization factor. This part of the process is unlike the process found in FIG. 2 which requires all utilization factors to be determined before a graphical representation is created. In FIG. 3, after each utilization factor is plotted, a final graph is created in a step 395.

Figure 4:
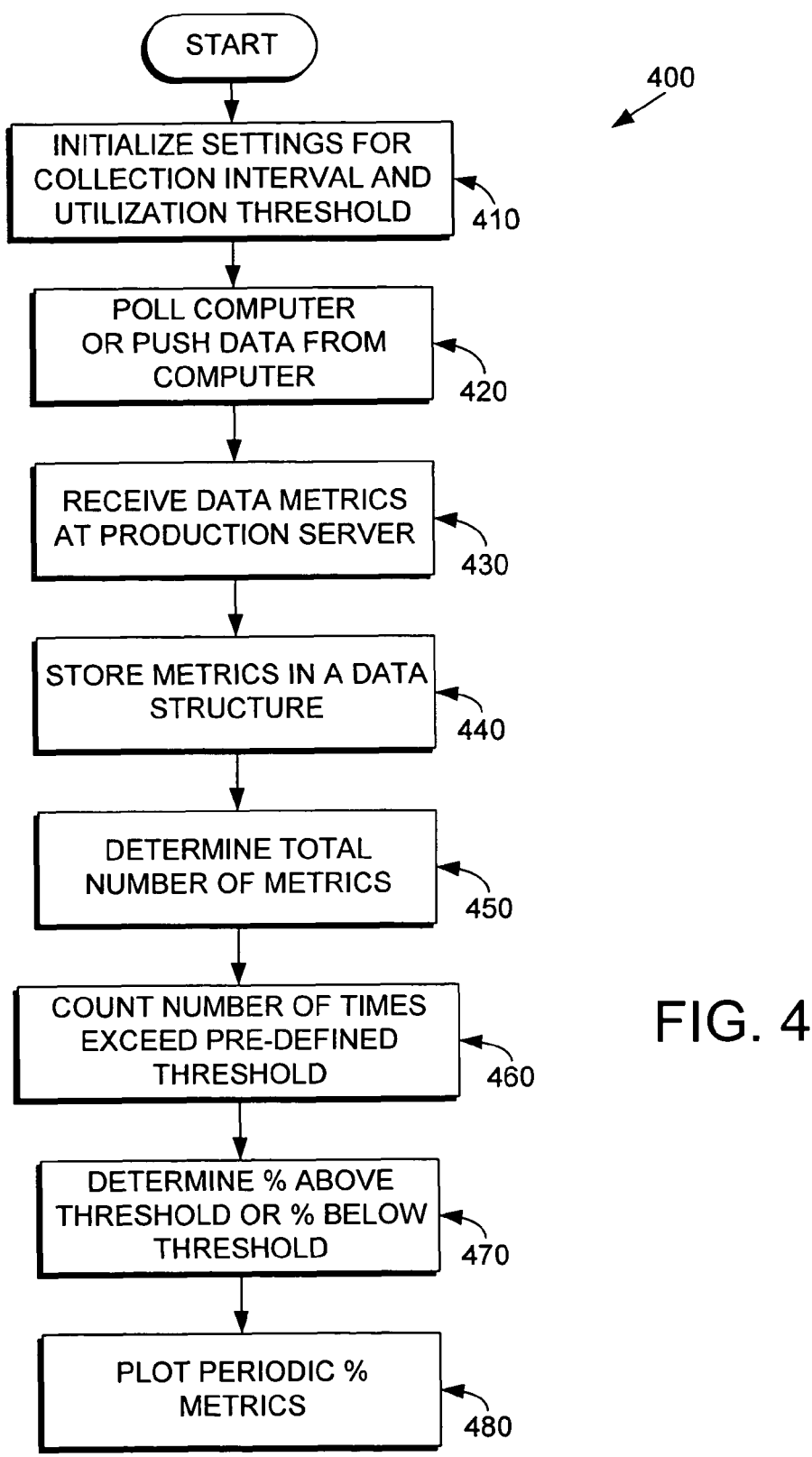
FIG. 4 is a flowchart illustrating an exemplary process for evaluating the performance of a computer system in accordance with another embodiment of the present invention.

Now referring to FIG. 4, another method of the process for evaluating the performance of a computer system is disclosed. FIG. 4 shows a variation on the processes found in FIG. 2 and FIG. 3 but essentially illustrates the steps to accomplish the present invention.

In a step 410, the user may determine some initial conditions before the process can begin. The user may determine how often data is to be collected. The user may also set how long data is to be collected (e.g. 10 days, 30 days, etc.). In one embodiment, the user determines which computing device(s) from which data shall be collected. It is possible that the user may want to collect data from all computing devices over a particular period. However, the user may also evaluate a segment of computing devices, which is beneficial if those computing devices handle particular applications or users. For example, if an increase in computer access is anticipated or an increase in applications is expected, the targeted computing devices could be evaluated. A user may provide the utilization threshold for the given data. The utilization threshold may vary depending on the type of data to be collected and may vary depending on the use of the computing device.

In a step 420, data is extracted from computers by way of any number of software programs. The software programs are programmed to collect the data, and copy or transfer the data to a production server in a step 430. For example, in a UNIX network, a CRON process may be deployed to each computer to be executed periodically to collect data from the computers. (The terminology CRON means the UNIX clock software program that executes commands at specific dates and time according to instructions in a file.) The data may be transferred to the production server by the same or different CRON process. Alternatively, the computer could be programmed to push data to a collection point that may reside within the computer or reside on the production server.

In a step 440, data is stored in a data structure. The effort to receive data and store it is not an instantaneous process and may occur over an extended period of time. A step 450 shows that the total number of metrics is to be determined. A count of the metrics that exceed a pre-defined threshold is determined in a step 460 followed by a determination of the percentage of metrics above or below the threshold in a step 470. The results culminate in the plotting of the percentage of metrics in a step 480.

Figure 5:
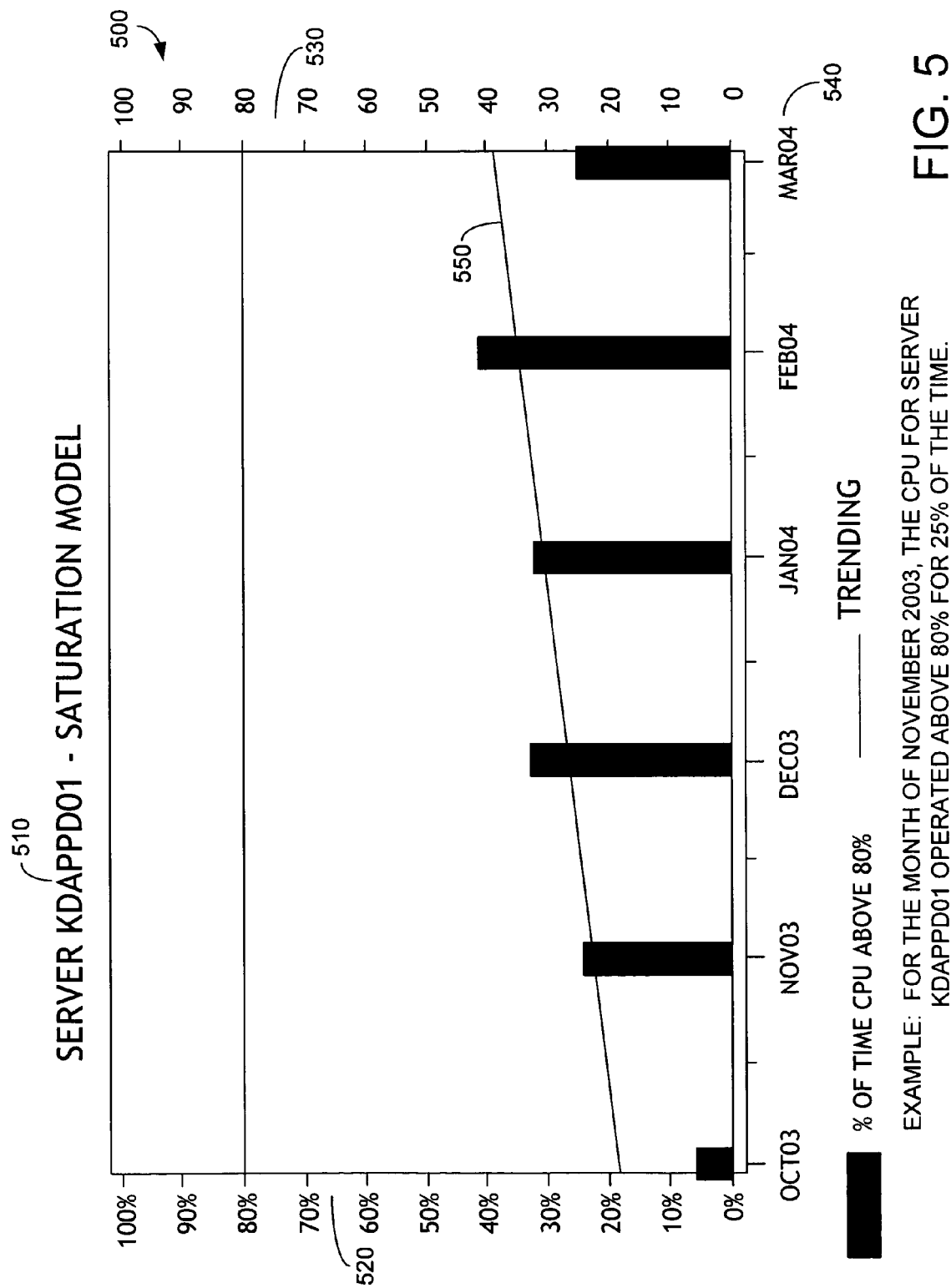
FIG. 5 is an exemplary graph illustrating utilization factors based on CPU metrics in accordance with an embodiment of the present invention.

Now referring to FIG. 5, an illustration of the results of the processing of utilization factors is disclosed. FIG. 5 depicts a graphical representation 500 of the results of calculating utilization factors from metrics that were collected computers in one or more networks. This graph shows a server kdappd01 510 and the calculated results of utilization factors for CPU usage.

The left and right side of the graph are calibrated percentages 520 and 530 that indicate the amount of time in percentages for CPU usage. For example, in October 2003, 6% of the time the CPU operated above 80% and in February 2004, 42% of the time the CPU operated above 80%. As illustrated, monthly data 540 can be shown successively for the data collected. One ordinarily skilled in the art will appreciate that the monthly data is one embodiment for showing the percentages. The user has the flexibility of illustrating the data on an hourly, daily, monthly, quarterly, or yearly basis.

An aspect to this invention is that as data is graphically represented, a linear trend line 550 may be established to show a forecast of future usage and needs. In FIG. 5, linear trend line 550 indicates a projection of the CPU usage for the given server. With the current data, the projection could be made that CPU usage will be at or above 80% for 80% of the time around February 2005 and would be at or above 80% for 100% of the time starting in June 2005.

One skilled in the art will appreciate that methods and systems in accordance with the present invention may be implemented using computer software. Such software may take the form of computer-readable code embodied on one or more computer-readable media. Software implementing the present invention may operate independently, but may also be incorporated with other software or vendor programs. Any software language may be used to implement methods and systems in accordance with the present invention.

The invention claimed is:

1. A computer-readable storage medium having computer-useable instructions embodied thereon causing a computer to perform a method for evaluating the performance of a computer system, the method comprising:
   (a) receiving, from a user, an indication of a threshold value for each of two or more performance characteristics of a reporting computer;
   (b) periodically gathering one or more sets of performance data respectively related to one or more reporting computers on a user selectable time frame of at least seconds, minutes, hours, days, months and years, wherein a set of performance data comprises data related to the two or more performance characteristics;

(c) Communicating the one or more sets of performance data to a data structure; and (d) by way of a processor of said computer:

(1) determining a subset of the one or more sets of performance data by sampling the one or more sets of performance data according to the respective thresholds for each performance characteristic, the subset comprising an integer count for each performance characteristic, the count determined for each performance characteristic by counting the number of sets of performance data having a value for the performance characteristic that is beyond the respective threshold;

(2) determining a total number of the one or more sets of performance data having communicated to said data structure;

(3) determining from the subset, a utilization factor for at least one of the one or more performance characteristics associated with each of the one or more computers, wherein the utilization factor is a performance ratio of the count for the performance characteristic divided by a total number of the one or more sets of performance data;

(4) without user interaction, automatically repeating steps (a), (b), (c) and (d) to graphically represent the utilization factor to evaluate performance; and (5) generating and presenting a graph of the utilization factors plotted over time to illustrate performance of the computer system wherein the graph of the utilization factors plotted over time provides a user with a trend analysis to forecast at least one resource of the computing system, and wherein the graph includes a trend line to facilitate trend analysis, the trend line forecasting a time when the one or more reporting computers will need one or more additional resources.

2. The medium of claim 1, wherein one or more sets of performance data describes performance characteristics of at least one of input/output (I/O), central processing unit (CPU), memory, and disk access.

3. The medium of claim 2 wherein one or more computers comprises:

at least one of a server, telecommunication switch, personal computer, and computing device.

4. The medium of claim 3 wherein communicating the one or more sets of performance data to a data structure comprises:

copying the one or more sets of performance data to at least one of a database, spreadsheet, storage medium, array, and a specified location within the respectively related one or more computers.

5. The medium of claim 4 wherein providing a subset of the one or more sets of performance data by sampling the one or more sets of performance data according to a threshold comprises:

counting a number of performance data that exceed the threshold.

6. The medium of claim 4 wherein providing a subset of the one or more sets of performance data by sampling the one or more sets of performance data according to a threshold comprises:

counting a number of performance data that do not exceed the threshold.

7. The medium of claim 1 wherein providing a subset of the one or more sets of performance data by sampling the one or more sets of performance data according to a threshold comprises:

extracting the subset of the one or more sets of performance data to evaluate any number of computing systems.

8. A computer-readable storage medium having computer-useable instructions embodied thereon causing a computer to perform a method for evaluating processing capacity, the method comprising:

(a) receiving, from a user, an indication of a threshold value for two or more performance characteristics of a reporting computer;

(b) measuring samples of performance of one or more applications in one or more reporting computers, wherein a sample is a set of measurements of the two or more performance characteristics;

(c) collecting the samples in the one or more reporting computers on a user defined periodic basis;

(d) communicating the samples to a computing device over at least one communication channel, the samples being stored in a data structure;

(e) determining a total number of samples in the data structure that were collected on the periodic basis for a predetermined time interval;

(f) identifying a subset of the samples by counting the number of samples having a measurement of a performance characteristic beyond the respective threshold indicated by the user, wherein the subset is a set of counts, and wherein the threshold is a value that is associated with one or more sets of user predefined performance criteria and indicates a critical point in the performance of the one or more computers at which computing resources are to be evaluated;

(g) calculating one or more utilization factors from the subset wherein the utilization factors are performance ratios for each of the performance characteristics based on counts of the one or more samples included in the subset divided by the total number of samples in the computing device;

(h) plotting at least one of the utilization factors;

(i) without user interaction, automatically repeating steps (b), (c), (d), (e), (f), (g), and (h) to create a graph of the plotted utilization factors to evaluate processing capacity wherein the graph of the plotted utilization factors provides a user with a trend analysis to forecast at least one resource of the one or more computers, and wherein the graph includes a trend line to facilitate trend analysis, the trend line forecasting a time when the one or more reporting computers will need one or more additional resources; and (j) provisioning the one or more additional resources in advance of the forecasted time.

9. The medium in claim 8 wherein a periodic basis comprises:

a time frame of how often samples of performance are taken.

10. The medium of claim 9 wherein a data structure comprises:

at least one of a database, spreadsheet, storage medium, array, and a specified location within the one or more computers.

11. The medium of claim 10 wherein a predetermined time interval comprises:

being at least one of daily, monthly, quarterly, and yearly.

12. A computer-implemented system for capacity planning comprising:

at least one reporting computer operable to provide metrics on applications and computing hardware, wherein a metric is a set of performance data for two or more performance characteristics;

at least one data structure operable to collect and store one or more metrics related to the at least one reporting computer;

at least one computing device operable to:

(1) receive, from a user, an indication of threshold performance criteria for two or more performance characteristics of a reporting computer, (2) manipulate the metrics in the at least one data structure to extract a subset of the one or more metrics according to the user predefined threshold performance criteria, wherein the subset is a set of counts of metrics having a performance characteristic value beyond the threshold performance criteria received from the user, (3) count a total number of metrics stored in the at least one data structure related to the at least one reporting computer, and (4) without user interaction, generate a graph that graphically represents one or more utilization factors with a trend line to forecast a time when the one or more reporting computers will need one or more additional resources; and a plurality of links operable to interconnect the at least one reporting computer, the at least one data structure, and the at least one computing device to facilitate the transfer of data back and forth;

wherein the at least one computing device calculates the one or more utilization factors from the subset and the one or more metrics, and wherein the utilization factors are a performance ratio of each of the counts included in the subset and the total number of metrics, the utilization factors are plotted against time on a graph and the graph provides a trend analysis to forecast at least one resource for the computer-implemented system.

13. A computer-readable storage medium having computer-useable instructions embodied thereon causing a computer to perform a method for evaluating the performance of a computer system, the method comprising:

executing software to measure samples of performance of one or more user identified applications in one or more user identified computers;

determining from the samples a total count over a predetermined time interval, wherein the time interval is determined by a user;

extracting from the samples a subset according to a threshold wherein the subset is a count of metrics according to the threshold and the threshold is a value set according to one or more user predefined performance criteria to extract the subset from the one or more computers;

calculating a utilization factor from the subset and the samples wherein the utilization factor is a performance ratio of the count of a performance characteristic contained in the subset and a total number of the samples;

without user interaction, generating a graph that graphically represents the utilization factor to evaluate performance wherein the utilization factor is plotted on a graph and the graph provides a trend analysis to forecast at least one resource of the one or more computers, and wherein the graph includes a trend line that indicates a trend in plotted utilization factor; and that forecasts a time when the one or more reporting computers will need one or more additional resources; and provisioning the one or more additional resources in advance of the forecasted time, wherein provisioning includes one or more of enlarging a capacity of a current component, adding an additional component, and procuring an additional computing device.

14. The medium of claim 13 wherein calculating a utilization factor from the subset of the samples comprises:

dividing the subset by the total number of the samples to form the performance ratio.

15. The medium of claim 13 wherein extracting from the samples the subset according to the threshold comprises at least one of:

counting a first number of performance data that do not exceed the threshold; and counting a second number of performance data that exceed the threshold.

16. The medium of claim 13 wherein the predetermined time interval comprises:

being at least one of daily, monthly, quarterly, and yearly.

17. The medium of claim 8, wherein the threshold is flexibly changed depending on the performance criteria to be targeted.

18. The medium of claim 1, wherein the threshold indicates a critical point in the performance of the one or more computers at which computing resources are to be evaluated.

* * * * *